(12) United States Patent
Nannini et al.

(10) Patent No.: US 7,132,583 B2
(45) Date of Patent: Nov. 7, 2006

(54) TRANSFORMATION METHOD OF PRODUCTS CONTAINING AMIANTUS

(76) Inventors: Maurizio Nannini, 7, Viale Matteotti, 44012 Bondeno (IT); Remo Tralli, 84, via Provinciale, 44017 Scortichino (IT)

( * ) Notice: Subject to any disclaimer, the term of this patent is extended or adjusted under 35 U.S.C. 154(b) by 412 days.

(21) Appl. No.: 10/444,525

(22) Filed: May 23, 2003

(65) Prior Publication Data

US 2003/0225308 A1   Dec. 4, 2003

(51) Int. Cl.
*A62D 3/00* (2006.01)
*E04C 1/00* (2006.01)
*E04G 21/00* (2006.01)

(52) U.S. Cl. .................. 588/300; 588/313; 588/320; 588/411; 588/254; 52/745.19; 52/750; 52/900

(58) Field of Classification Search ............... 588/300, 588/313, 320, 411, 254; 52/745.19, 750, 52/900
See application file for complete search history.

(56) References Cited

U.S. PATENT DOCUMENTS

| | | | | |
|---|---|---|---|---|
| 3,204,019 A | * | 8/1965 | Schulze | 264/122 |
| 3,880,664 A | * | 4/1975 | Schulze | 588/254 |
| 3,933,515 A | * | 1/1976 | Yang | 106/700 |
| 5,096,692 A | * | 3/1992 | Ek | 423/659 |
| 5,614,452 A | * | 3/1997 | Clausen et al. | 501/155 |
| 2005/0096495 A1 | * | 5/2005 | Mason et al. | 588/252 |

OTHER PUBLICATIONS

Grant and Hackh's Chemical Dictionary, 5th Ed., McGraw-Hill Book Co. USA, (1987), p. 30, ISBN 0-07-024067-1.*

* cited by examiner

*Primary Examiner*—Timothy C. Vanoy
(74) *Attorney, Agent, or Firm*—Lackenbach Siegel, LLP; J. Harold Nissen

(57) ABSTRACT

A method for transforming a waste product containing or completely formed of amiantus comprising subjecting the waste product to several working phases and adding of components such as calcined alumina, clay and material having a given porosity so to produce a final manufactured product free of any amiantus.

16 Claims, 5 Drawing Sheets

| PARAMETER | | ETERNIT | ⩾63μm |
|---|---|---|---|
| $SiO_2$ | % | 20.4 | 17.7 |
| $Al_2O_3$ | % | 4.0 | 4.8 |
| $Fe_2O_3$ | % | 4.2 | 2.5 |
| $TiO_2$ | % | 0.3 | 0.3 |
| CaO | % | 63.0 | 65.00 |
| MgO | % | 4.1 | 0.8 |
| $Na_2O$ | % | 0.2 | 0.2 |
| $K_2O$ | % | 0.5 | 0.7 |

FIG.4

| MINERALOGICAL PHASE | WEIGHT % |
|---|---|
| Quartz | 3.1 |
| Calcite | 32.3 |
| Chrysotile | 9.4 |
| Feld K | 0.4 |
| Illite | 0.3 |
| Hematite | 0.2 |
| Amorphous | 54.4 |

FIG.5

| MINERALOGICAL PHASE | WEIGHT % |
|---|---|
| Quartz | 2.3 |
| Calcite | 35.5 |
| Chrysotile | 6.9 |
| Amorphous | 55.3 |

FIG. 6

| PARAMETER | | SAMPLE WITH PROCESS |
|---|---|---|
| $SiO_2$ | % | 25.4 |
| $Al_2O_3$ | % | 52.4 |
| $Fe_2O_3$ | % | 2.17 |
| $TiO_2$ | % | 0.83 |
| $CaO$ | % | 14.7 |
| $MgO$ | % | 1.54 |
| $Na_2O$ | % | 0.26 |
| $K_2O$ | % | 0.81 |

FIG. 7

TRANSFORMATION METHOD OF PRODUCTS CONTAINING AMIANTUS

BACKGROUND OF THE INVENTION

This invention is concerned with the transformation of products containing amiantus. The term amiantus in some dictionaries is spelled "amianthus". More specifically, the invention is concerned with a novel method for the clearing or cleaning of amiantus and/or for taking care of waste materials containing amiantus so as to render the same innocuous and salubrious and to obtain materials from use in the manufacture of products, materials for the use in the construction of buildings and other structures or for such other uses to which construction materials are used.

DESCRIPTION OF THE PRIOR ART

According to the prior art, there are known methods which actuate and accomplish the storage in special burrows for toxic waste.

Provision is made for the encapsulation with hydraulic and/or chemical ligands and the englobing by means of resins.

All these solutions do not actuate and accomplish the final disposal, but they only remove the problem temporarily because they do not destroy or modify the amiantus structure so as to render it a non-toxic structure.

BRIEF SUMMARY OF THE INVENTION

A primary purpose of the present invention is to transform the amiantus or the waste material containing amiantus to a useful product for the production of products having an economic advantage so that the costs for the transformation plus a profit is made while distributing useful products.

The method according to the invention comprises several working phases and the addition of selected components such as calcined alumina, clay and materials having a given porosity.

The invention is concerned with a unique transformation method combined with the added components to provide for and to permit the obtention of materials with chemical and/or physical features so as to justify their use as building materials, as well as being the same or equivalent to other common materials used, as well as being usable for other products.

The danger of amiantus and the danger of the waste material containing amiantus has been a concern since the nineteen hundred forties and also, unfortunately, there is a concern that individuals develop illnesses and the possibility of developing tumors which struck those persons exposed to the waste material with amiantus or become in contact with the cited substance.

Therefore, the inventor being quite conscious of the toxicity effect of the amiantus, asbestos and verified the connection between the tumor commencement and the casual exposure, as well as that a large number of States and countries have issued special laws so to prevent its use, developed the method to eliminate the deleterious effects and results.

Generally, in the various States and countries, according to their laws and jurisprudence, there are laws which prevent the use of amiantus or waste products containing amiantus, and this invention proposes to overcome these problems.

Therefore, the problem for the disposal of this waste material has arisen in connection with the already existing materials. And, considering the big periocolosity of the substance, it is always a large necessary expense for actuating and accomplishing the disposal.

DETAILED DESCRIPTION OF THE INVENTION

Figure 1:
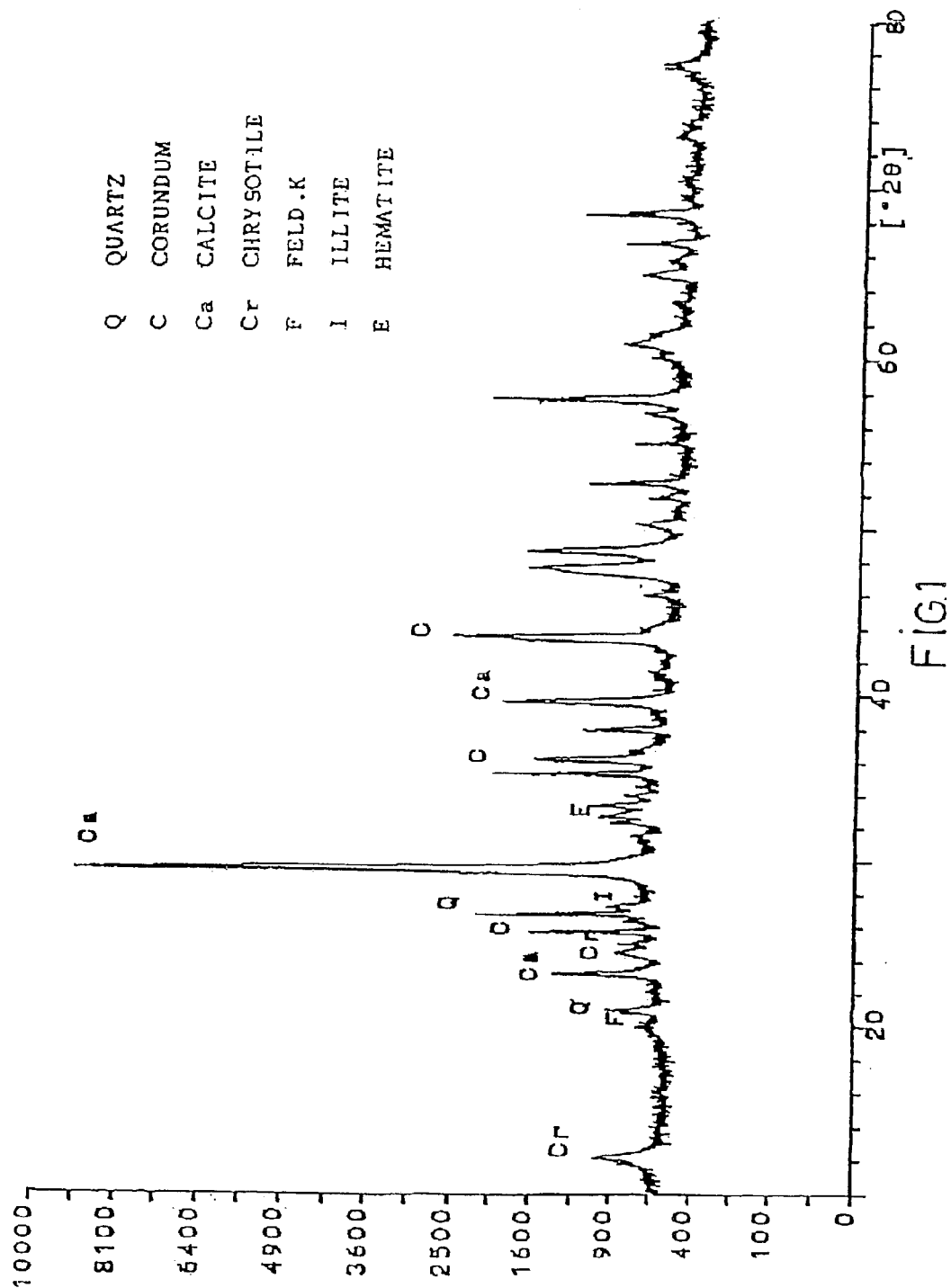
FIG. 1 is a DRX graphic representation for the test of a sample of cement and amiantus; the amiantus is present like chrysotile and it is illustrated in the first and in the fifth peak.
Figure 2:
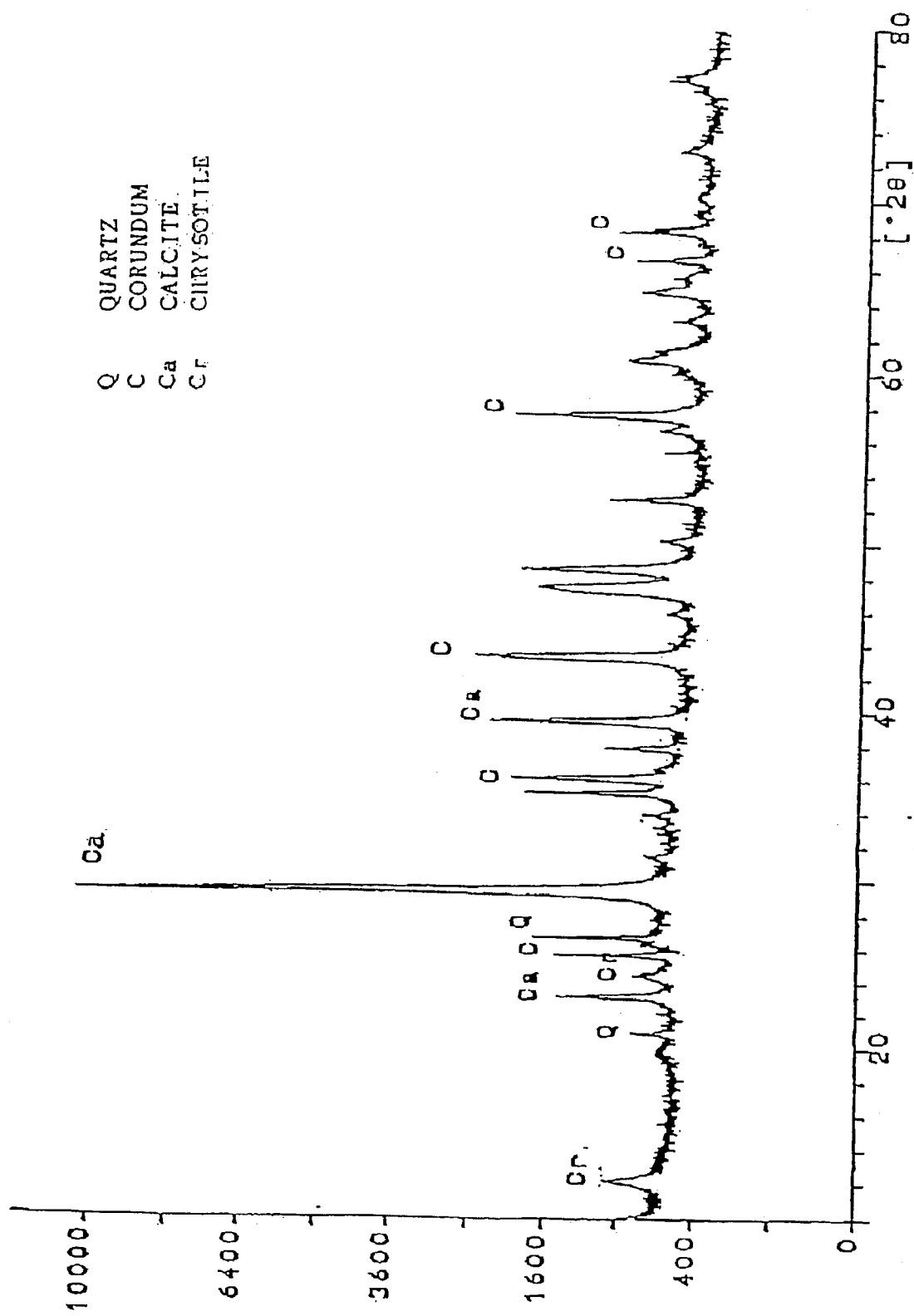
FIG. 2 is graphic representation of the text of a sample, always with the same cited manners of "eternit" in dust with pieces larger than 0.063 millimeters, that is with a grain size larger than what is produced or provided by the invented method; also, in this analysis amiantus is present in form of chrysotile.
Figure 3:
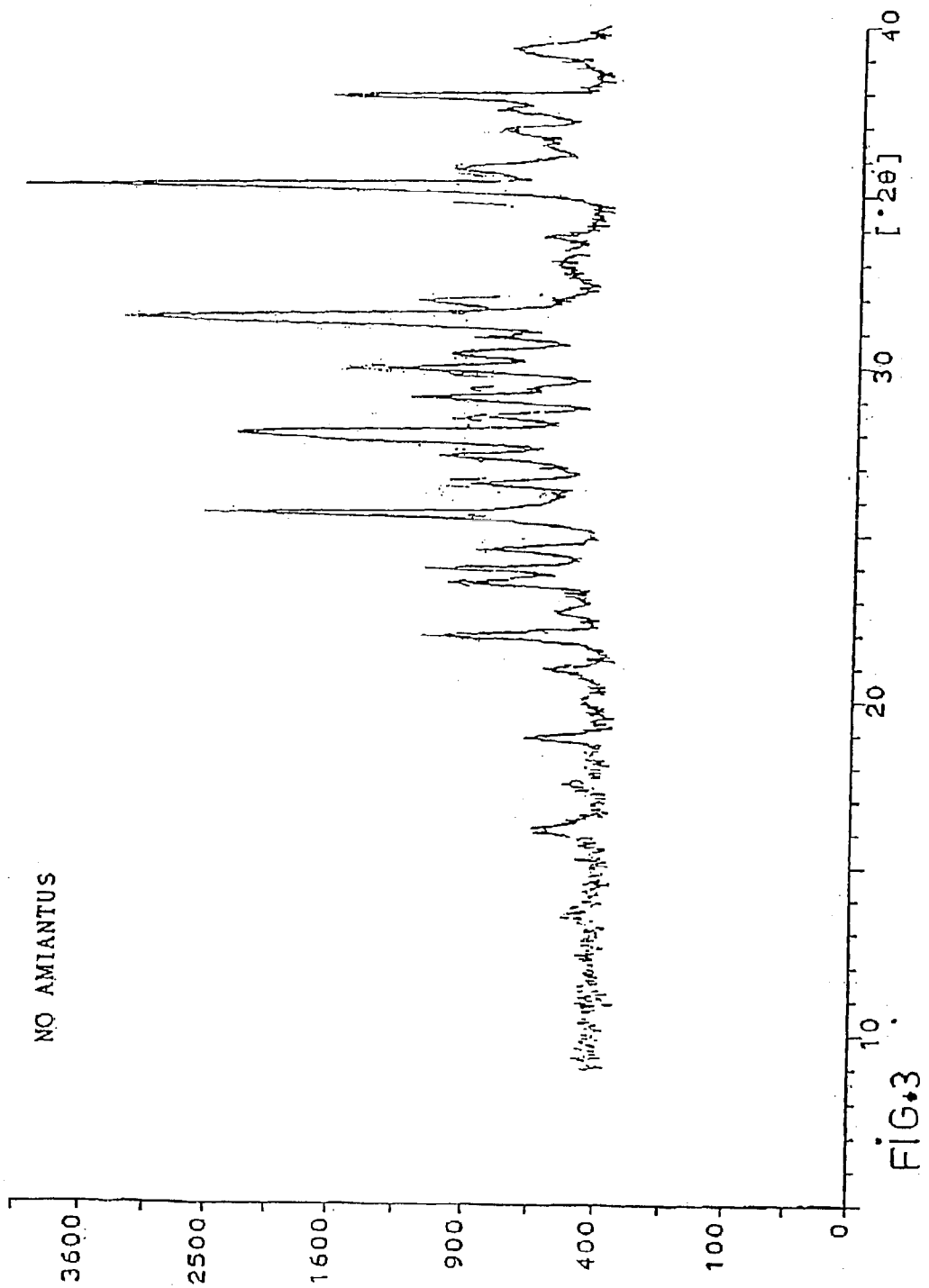
FIG. 3 is DRX graphic representation of the text of a sample obtained in accordance with the teachings of the invented method, wherein 40% of eternit is mixed with 30% of calcined alumina and 30% of clay; to this mixture, there is added 20–35% of water to the mixture of the first two elements and the resultant mixture is formed, dried and cooked up to a temperature of 1200° C. with the modes cited; subsequently, the last-mentioned mixture is coated and a testing takes place with the same mode of the previous test; the test shows that the amiantus is totally absent.

Table I illustrates a table with the completion of the chemical test in percentage of the eternit and of the same in grain size greater than or equal to 0.063 millimeters.

TABLE I

| PARAMETER | ETERNIT | ≧63 μm |
|---|---|---|
| $SiO_2$ % | 20.4 | 17.7 |
| $Al_2O_3$ % | 4.0 | 4.8 |
| $Fe_2O_3$ % | 4.2 | 2.5 |
| $TiO_2$ % | 0.3 | 0.3 |
| CaO % | 63.0 | 65.00 |
| MgO % | 4.1 | 0.8 |
| $Na_2O$ % | 0.2 | 0.2 |
| $K_2O$ % | 0.5 | 0.7 |

Table II illustrates the percentage of the eternit minerals expressed in weight percentage.

TABLE II

| MINERALOGICAL PHASE | WEIGHT % |
|---|---|
| Quartz | 3.1 |
| Calcite | 32.3 |
| Chrysotile | 9.4 |
| Feld K | 0.4 |
| Illite | 0.3 |
| Hematite | 0.2 |
| Amorphous | 54.4 |

Table III sets forth the weight percentage for the eternit sample in grain sizes greater than or equal to 0.063 millimeters; it to be noted that the amiantus is always present in a manner similar to chrysotile.

TABLE III

| MINERALOGICAL PHASE | WEIGHT % |
| --- | --- |
| Quartz | 2.3 |
| Calcite | 35.5 |
| Chrysotile | 6.9 |
| Amorphous | 55.3 |

Table IV illustrates a table with the minerals percentages present in the sample subjected to the invented method; all the form is expressed like graphics are obtained with an x-ray diffractometer on the basis of rules WWPOS 031/99.

TABLE IV

| PARAMETER | SAMPLE WITH PROCESS |
| --- | --- |
| $SiO_2$ % | 25.4 |
| $Al_2O_3$ % | 52.4 |
| $Fe_2O_3$ % | 2.17 |
| $TiO_2$ % | 0.83 |
| CaO % | 14.7 |
| MgO % | 1.54 |
| $Na_2O$ % | 0.26 |
| $K_2O$ % | 0.81 |

The transformation method of products or waste material containing amiantus provides for several working phases and the addition of particular substances so as to modify the intrinsic structure of the materials to be cleared.

The working phases, with the addition at a in the convenient time of particular substances, are necessary and sufficient to change the condition of the waste product to render the wanted transformations so as to have mineralogical transformation take place and to produce a product which no longer has any of the deleterious nature of the product or amiantus structure. Moreover, each cited phase together with the addition of the substances provided with the elements necessary for the transformations are a sole part of the method so that the transformations are not possible if the particular conditions are not met.

The invented method consists essentially of nine working phases with the addition during the working of the elements useful for the transformations.

The first phase is a grinding phase. The amiantus alone and/or the waste product with amiantus will hereinafter be alone referred to as "waste products" or "undesired waste products" and according to the teachings of this invention will be any product partially or totally including amiantus, and waste products are placed inside a jaw crusher so as to obtain the pieces for the subsequent tertiary crushing inside an aro mill.

This particular mill (the aro mill) is able to reduce the amiantus and the waste products to a dimension no greater than or up to 0.063 millimeters.

The material going out to the mill is sent to a wind separator regulated in such a way that those pieces of a dimension greater than 0.063 millimeters are recycled in the same manner until the dimension or size of the waste product is less than or no greater than 0.063 millimeter.

Once the desired or wanted dimension of the material is obtained, it is then stored in a sealed container.

The second phase is concerned with a dosing of the waste product. The micronized amiantus or the waste with amiantus are weighed and also the other used components and waste products are weighed: the calcined alumina, the clay and the materials having the given porosity. Those materials having the required or given porosity which are generally used are wood flour or hazel-shell flour. This last component changes in the use with different weight percentages based on the wood flour or the hazel-shell flour are used.

The third working phase is a mixing phase. The dosed components are weighed and then the waste products are placed inside a counter-rotating mixer with a vortex to reach the homogenization of the mixture. In this mixing step, (or third step), nebulized water is added in a percentage of from 20% to 35% of the total of the dry weight of the components on the basis of the necessity to obtain the necessary plasticity for the next step which is an extrusion step.

The next or fourth phase is an extrusion. In this extrusion phase, a normal extruder for the production of building goods is used. The operation inside of the extruder provides for obtaining a plastic mass that is forced through a die chaser, which results in a semi-manufactured product for use in the next working phase.

The fifth phase is a dimensioning phase. The obtained or resultant semi-manufactured product is automatically cut and dimensioned to produce a product in the wanted or desired sizes.

The sixth phase is a drying phase. The semi-manufactured product produced upon completion of the fifth phase is dried at temperature lower than 100° C. so that the semi-manufactured product it does not reach a consistency which requires handling without possibility of deformations.

The next or seventh phase is a burning phase. In the burning phase, the manufactured product is dried with a residual dampness up to 1%^, and the manufactured product is then passed through a furnace which reach a temperature of up to 1250° C.

The cooking cycle or burning phase takes place as follows: for the first two hours the product reaches a temperature of up to 350° C., and in the next two hours the product reaches a temperature up to 550° C., then in next two hours the product reaches a temperature up to 800° C., in the next three hours the product reaches a temperature up to 1050° C., in the next two hours the product reaches a temperature up to 1180° C. and at the end and after another four hours the product reaches a temperature 1200° C.

At the end of the burning phase after the temperature of 1200° C. is reached, the manufactured product is allowed to cool in a natural manner. After this manufacture transformation phase and cooling, the manufactured product is sintered in a cooking phase.

The next or eighth phase, is an inspection of the product on the basis of the necessary requirements for the next uses. In this phase, the amiantus in its original conditions is no longer present inside the manufactured product so that the waste product is completely eliminated.

The ninth and last phase is a packaging/storing phase. The obtained manufacture, without or free of amiantus is then packaged and stored to complete the working cycle. The materials so obtained have insulation and refractory features, and they can have all the certifications required for materials which are used in building.

The invented method is consequently a very economical method to solve the problem of the amiantus disposal definitively such that at the end of the working phases, the amiantus is no longer present any more, but what is present is only non-present toxic materials which are acceptable materials.

In the invented method, a fundamental feature is the presence, in addition to the cooking phase that putting thermal energy realizes the transformation, of the additional components added or put in during the dosing and mixing phases. In the various phases the quantity percent of the amiantus or of the waste product with amiantus is of a value or a percentage of from 30% to 40% of the dried mixture. After determining the quantity of the amiantus and depending on the quantity present, a refractory clay is added in quantity percent comprising up to 30% of the weight of the mixture of the clay and the amiantus. The clay issues in the mixture have the function of sintering ligand and of oxides bearer for transforming the crystallographic structure of the amiantus in a highly stable form formed to the oxides of the elements which form the same amiantus.

In the mixing phase, a material having given porosity is placed into the mass in working so as to lighten the structure in a percentage to be varied on the basis of the desired features of the final product.

Another fundamental component is the adding to the dosing during the dosing phase and to the mixing, is the calcined alumina in a quantity percent of from 26% to 30% of the dried weight. The alumina, i.e. the metallic oxide contained in the alum, is to be obtained through different processes.

A known industrial process to obtain the same is Le Chatelier-Löwing process wherein the bauxite, i.e. the alumina metatrihydrate, is fused at 1000–1200° C. with soda ash inside a rotary kiln and it is then lixiviated (washed or percolated with soluble matter) with hot water.

The alumina trihydrate is then changed into hydroxyaluminate which passes in solution $Al_2O_3+2NaOH+3H_2O=2Na[Al(OH_4)]$. From the filtered solution it is precipitated with carbon dioxide at 70° C. to the aluminum at the state of pure hydroxide $2Na[Al(OH_4)]+CO_2=2Al(OH_3)+Na_2CO_3+H_2O$ which changes in oxide for liming at 1200° C.–1700° C.

The calcined alumina is preferred in this method, as it is thinly divided and is extremely reactive for permitting to have final goods with good features of loading resistance and for the high temperatures.

In order to realize the invented method, other types of aluminum may also be used but with hydroxil groups which when heated become alloyed with the amiantus or with the waste with amiantus. This is because, if it is not aluminum with hydroxil groups but substances with alkaline base, the transformation of the amiantus always together with other innocuous minerals is obtained.

Of course, making the cited phases, by the final goods have a vitreous structure so that it is not suitable for use at present for building materials or manufacturers.

The calcined alumina, because of its unique structure, loss in hot, the hydroxil group practically contemporary with the amiantus or waste with amiantus, the available valences of the aluminum are rendered such that reacting with the mineral oxide deoxidizing of the amiantus brings to the formation of different mineralogic structures.

The diversity of the mineralogic structures is due to the composition of the material to be clear and to the minimum percentage variability of the elements put in the dosing or/and in the mixing.

The transformation method in fact changes the amiantus or waste with amiantus in other non-toxic minerals like mullite, faialite, ghelenite, corundum, hematite, cordierite and wollastonie.

So having materials to be used for manufactures is not harmful.

The variability of the obtained products or articles of manufacture is due to the type of amiantus or waste with amiantus and to the minimum variability of the components used in the doxing and in the mixing. The amiantus in fact is a mineral belonging to the anphibole (i.e. calcium silicates and magnesium silicates) or to the serpentine (magnesium silicate) and it presents itself in different forms.

As a part of the anphibole and with the presence of magnesium silicatae, calcium and iron, are the crocidolite and the amosite. Belonging instead to the magnesium silicates is the chrysotile. These types of amiantus are more useful for their physical features which permit easy working.

Other types of amiantus are the actinolite, the anthophyllite and the tremolite. The lowest common denominators or form of the different types of amiantus is the presence of hydroxil groups in the form of water of hydration (H—O—H). With high temperatures the hydroxil group presents in the amiantus abandons the structure and almost contemporary the calcined alumina losses at hot the hydroxil groups making available the valances of the aluminum. These amiantus products reacting with the oxides of the dehydroxyling minerals of the amiantus provide for the formation of minerals with different mineralogic structures, that is, minerals innocuous for the health as cited to the exit of the transformation method.

Also the clay issues has the function to oxide bearer for the reaction at the solid state at hot and of sintering ligand. All the obtained materials are permanent mineral structures. For an example and for test of the invented method are shown in sheets 1, 2, 3, 4 and 5, the chimic analysis X RF oxides with fusions make on the base of the reference set of rules and with x-ray diffractometer.

All the illustrated tables are instead obtained with chemical analysis XRF eight oxides, with fusion, on the basis of rules POS 011/00. It is to be noted that the tests confirm what was previously cited. The material obtained by the present method is to be directly used in the building or for the production of different articles.

The above cited example is given for the sole purpose to illustrate the invented method.

The realization forms are explanatory and not limitative of the invented method. Each actuative form is to be considered inside the method if technical equivalent on the base of the used substances. It is to point out that the fundamental feature of the method is to produce building material and articles economically advantageous, and it solves the problem of disposal of amiantus of waste with amiantus.

With respect to the drawings, these are just intended as providing a pictorial representation of what is clearly set forth in the specification, and may be omitted if necessary. Nevertheless, they are useful to show the different components of waste products containing amiantus or formed completely of amiantus.

While there has been shown what is considered to be the presently preferred mode for carrying out the invention, various changes and modifications may be made without departing from the scope of the invention.

The invention claimed is:

1. Transformation method of waste products containing or including all amiantus, for rendering thereof innocuous and salubrious and for use in manufacture of products for construction material comprising the steps of:
    adding to the waste product components selected from the group consisting of calcined alumina, clay and materials having a porosity substantially equivalent to wood flour or hazel-shell flour at least once; and
    comprises working steps which includes the following working phases:

a grinding phase wherein the waste products are reduced to a dimension no greater than 0.063 millimeters to produce micronized amiantus;

a dosing phase in which the different components including the micronized amiantus are dosed and weighed;

a mixing phase wherein the components are placed inside a mixer and adding nebulized water in a range of from 20 to 35% of the total of dry weight;

an extrusion phase for realizing a plastic mass;

a dimensioning phase to obtain a semi-manufactured product of desired dimensions for use in construction of buildings or structures;

a drying phase for drying where the semi-manufactured product is dried to a temperature below 100° C.;

a burning phase in which the manufactured products are passed inside of a furnace capable of reaching a temperature of 1250° C. to subject the semi-manufactured product to a temperature up to 1250° C.; and an inspection phase and a final last phase of packaging/storing wherein the manufactured product, is free of amiantus, is packaged and stored for completion of the working cycle such that the manufactured product is usable in building structures.

2. The method as claimed in claim 1, including the step of adding to the fixed quantity of the waste product a refractory clay in a quantity per cent comprising up to 30% of the weight, and sintering the mixture of the waste product and clay.

3. The method as claimed in claim 2, wherein the calcined alumina is added to the dosing phase and to the mixing in a quantity per cent ranging from 26% to 30% of the dried weight.

4. The method as claimed in claim 3 wherein hazel-shell flour is added to the waste product.

5. The method as claimed in claim 4, wherein the burning phase includes the following burning phase steps:

for the first two hours the material is heated to a temperature of 350° C.;

for the next two hours and up to the fourth hour the material is heated to a temperature of 550° C.;

for the next two hours and up to the sixth hour the material is heated to a temperature of 800° C., for the next three hours the material is heated to the temperature of 1050° C.; and for another four hours of heating until a temperature of 1200° C. is reached.

6. The method as claimed in claim 1, wherein the calcined alumina is added to the dosing and to the mixing in a quantity per cent ranging from 26% to 30% of the dried weight, such that the product is divided and is extremely reactive.

7. The method as claimed in claim 1 wherein hazel-shell flour is added to the waste product.

8. The method as claimed in claim 1, wherein the burning phase comprises the following steps during which the resultant manufactured waste product is dried with a residual dampness up to 1% and the resultant manufactured product for use in the construction of building and other structures is passed through furnaces for heating up to a temperature of 1250° C., as follows:

a. the product passes through a cooking cycle for two hours and is heated in a furnace to a temperature up to 350° C.;

b. then the product is passed through a furnace and is heated up to a temperature of 550° C. for two hours;

c. the product is then passed through a furnace and heated to a temperature of 800° C. for two hours;

d. the product is then passed through a furnace and heated to a temperature of 1050° C. for three hours;

e. the product is then passed through a furnace and heated to a temperature of 1180° C. for two hours; and f. the product is then passed through a furnace and heated to a temperature of 1200° C. for four hours.

9. A method of transforming a waste product including amiantus or amiantus together with other undesired products or materials, all forming components of the waste product to be transformed comprising:

a grinding phase in which the waste product which includes amiantus alone or other waste products together with amiantus is reduced to a dimension no greater than 0.063 millimeters;

a dosing phase in which different components are weighed and having a given porosity including either wood flour or hazel-shell flour;

a mixing phase wherein the components are placed into a counter-rotating mixer and nebulized water is added in a percentage of from 20 to 35% of the total of dry weight of the components;

an extrusion phase for producing a plastic mass by forcing through a die chaser to produce a semi-manufactured product;

a drying phase for drying the semi-manufactured product to a temperature lower than or not to exceed 100° C.;

a burning phase where the manufactures of the waste products are passed inside furnaces to reach a temperature up to 1250° C.;

an inspection phase in which the amiantus or other waste products combined with amiantus is no longer present inside the resultant manufactured product such that the waste product is completely eliminated from the manufactured product;

and a packaging/storing phase in which the resultant manufactured waste product which is free of amiantus or amiantus and waste is packaged and stored to complete the working cycle.

10. The method according to claim 9, wherein the quantity per cent of the waste product is of a value from 30% to 40% of the dried mixture, and including the step of adding refractory clay to bring the percentage of the refractory clay up to 30% of the weight, and transforming the crystallographic structure of the waste into a highly stable form to form the oxides of the elements which form the waste, and in the mixing phase, to produce a manufactured product having a porosity which decreases the weight of the structure.

11. The method as claimed in claim 10, wherein the calcined alumina is added to the dosing and to the mixing in a quantity per cent of from 26% to 30% of the dried weight, in a divided form to render it extremely reactive.

12. The method as claimed in claim 9, wherein the burning phase comprises the following steps during which the resultant manufactured waste product is dried with a residual dampness up to 1% and the resultant manufactured product for use in the construction of building and other structures is passed through furnaces for heating up to a temperature of 1250° C., as follows:

a. the product passes through a cooking cycle for two hours and is heated in a furnace to a temperature up to 350° C.;

b. the product is then passed through a furnace and is heated up to a temperature of 550° C. for two hours;

c. the product is then passed through a furnace and heated to a temperature of 800° C. for two hours;

d. the product is then passed through a furnace and heated to a temperature of 1050° C. for three hours;

e. the product is then passed through a furnace and heated to a temperature of 1180° C. for two hours;

f. the product is then passed through a furnace and heated to a temperature of 1200° C. for four hours; and g. coating the product in a conventional manner, and then sintering the product in a cooking phase.

13. The method as claimed in claim 12, including adding the refractory clay in a quantity per cent comprising up to 30% of the weight of the waste product, and sintering of the oxides for transforming the crystallographic structure of the waste product into a highly stable form formed to the oxides of the elements which form the same amiantus, to provide the waste product with a porosity which results in a lighter structure.

14. The method as claimed in claim 13, including adding the calcined alumina in a quantity per cent ranging from 26% to 30% of the dried weight, such that the product is divided and is extremely reactive.

15. The method as claimed in claim 9, including the step of adding calcined alumina during both the dosing phase and to the mixing phase in a quantity percent of from 26% to 30% of the dried weight.

16. Transformation method of waste products containing or including all amiantus, for rendering thereof innocuous and salubrious and for use in manufacture of products for construction material comprising the steps of:

adding to the waste product components selected from the group consisting of calcined alumina, clay and materials having a porosity substantially equivalent to wood flour or hazel-shell flour at least once; and a heating phase which includes the following steps:

for the first two hours the material is heated to a temperature of 350° C.;

for the next two hours and up to the fourth hour the material is heated to a temperature of 550° C.;

for the next two hours and up to the sixth hour, the material is heated to a temperature of 800° C.;

for the next three hours heating until the temperature of 1050° C. is reached; and for another four hours heating until a temperature of 1200° C. is reached.

* * * * *